United States Patent
Dornier et al.

[11] Patent Number: 5,805,901
[45] Date of Patent: *Sep. 8, 1998

[54] STRUCTURE AND METHOD FOR MAPPING INTERRUPT REQUESTS IN A HIGH-SPEED CPU INTERCONNECT BUS SYSTEM

[75] Inventors: Pascal Dornier, Sunnyvale; Dan Kikinis, Saratoga, both of Calif.

[73] Assignee: Elonex I.P. Holdings Ltd., London, England

[*] Notice: This patent issued on a continued prosecution application filed under 37 CFR 1.53(d), and is subject to the twenty year patent term provisions of 35 U.S.C. 154(a)(2).

[21] Appl. No.: 753,254

[22] Filed: Nov. 12, 1996

Related U.S. Application Data

[63] Continuation of Ser. No. 425,254, Apr. 17, 1995, abandoned, which is a continuation of Ser. No. 86,719, Jul. 2, 1993, abandoned.

[51] Int. Cl.⁶ .............................. G06F 13/24; G06F 13/38
[52] U.S. Cl. ...................... 395/733; 395/868; 395/800.4
[58] Field of Search ................................ 395/500, 183.1, 395/860, 490, 800, 430, 200.01, 556, 200.15, 290, 479, 309, 281, 825, 259, 740, 306, 733, 285; 345/200; 434/49; 364/DIG. 1, DIG. 2; 340/825.22, 825.09

[56] References Cited

U.S. PATENT DOCUMENTS

| | | | |
|---|---|---|---|
| 3,881,174 | 4/1975 | Barnich | 395/868 |
| 4,090,116 | 5/1978 | Lippitt | 388/813 |
| 4,107,785 | 8/1978 | Seipp | 395/775 |
| 4,124,888 | 11/1978 | Washburn | 395/828 |
| 4,178,501 | 12/1979 | Luther | 235/54 |
| 4,207,687 | 6/1980 | Haas et al. | 434/49 |
| 4,484,273 | 11/1984 | Stifler et al. | 395/290 |
| 4,589,065 | 5/1986 | Auslamber et al. | 395/183.11 |
| 4,768,149 | 8/1988 | Knopik et al. | 395/867 |
| 4,905,182 | 2/1990 | Fitch et al. | 395/275 |
| 4,975,903 | 12/1990 | Wakerly et al. | 370/67 |
| 5,001,624 | 3/1991 | Hoffman et al. | 395/825 |
| 5,088,024 | 2/1992 | Vernon et al. | 395/291 |
| 5,191,657 | 3/1993 | Ludwig et al. | 395/285 |
| 5,359,715 | 10/1994 | Heil et al. | 395/308 |
| 5,410,709 | 4/1995 | Yu | 395/742 |
| 5,473,348 | 12/1995 | Fujimoto | 345/200 |

OTHER PUBLICATIONS

Microprocessor–Based Design, A Comprehensive Guide to Hardware Design, Michael Slater, Prentice Hall, N.J. 1989, p. 17.

*Primary Examiner*—Daniel H. Pan
*Attorney, Agent, or Firm*—Donald R. Boys

[57] ABSTRACT

A compressed I/O bus system for a general-purpose computer multiplexes 32 bit data and addresses on 32 of 42 dedicated parallel signal paths, and optimizes the bus structure by mapping bus requests made by peripheral devices to "high" memory portions of system RAM not dedicated to other purposes. In one aspect a bus controller is programmable to select translation routines stored in system RAM allowing various models and types of CPUs to be supported. Supported CPUs are interchangeable in the system. In another aspect a default interface attached to the compressed I/O bus of the invention, and translates bus states between the optimized compressed bus and one of an ISA bus or an EISA bus.

24 Claims, 8 Drawing Sheets

Signal Correspondence

| | | |
|---|---|---|
| 0 | D0 | BE0 |
| 1 | D1 | BE1 |
| 2 | D2 | A2 |
| 3 | D3 | A3 |
| 4 | D4 | A4 |
| 5 | D5 | A5 |
| 6 | D6 | A6 |
| 7 | D7 | A7 |
| 8 | D8 | A8 |
| 9 | D9 | A9 |
| 10 | D10 | A10 |
| 11 | D11 | A11 |
| 12 | D12 | A12 |
| 13 | D13 | A13 |
| 14 | D14 | A14 |
| 15 | D15 | A15 |
| 16 | D16 | A16 |
| 17 | D17 | A17 |
| 18 | D18 | A18 |
| 19 | D19 | A19 |
| 20 | D20 | A20 |
| 21 | D21 | A21 |
| 22 | D22 | A22 |
| 23 | D23 | A23 |
| 24 | D24 | A24 |
| 25 | D25 | A25 |
| 26 | D26 | A26 |
| 27 | D27 | A27 |
| 28 | D28 | A28 |
| 29 | D29 | A29 |
| 30 | D30 | A30 |
| 31 | D31 | A31 |

} Data 0..31 multiplexed with Address 2..31 and Byte Enable 0..1

| | |
|---|---|
| 32 | Byte Enable 2 |
| 33 | Byte Enable 3 |
| 34 | Clk |
| 35 | ADS |
| 36 | LDEV # |
| 37 | RDY # |
| 38 | R/W # |
| 39 | BREQ # |
| 40 | BACK # |
| 41 | RESET # |

} Separate control lines in addition to 32 D & A

Fig. 3

```
FFFF'0000 - FFFF'FFFF      BIOS ROM (RESET VECTOR)
FFFE'0000 - FFFE'FFFF      I/O SPACE (64 KB)
FFFC'0000 - FFFD'FFFF      INTERRUPT ADDRESSES
                           FFFC'0000    IRQ0
                           FFFC'0004    IRQ1
                           FFFC'0008    IRQ2
                           ....
                           FFFC'003C    IRQ15
0000'0000 - FFFB'FFFF      MEMORY SPACE
```

STRUCTURE AND METHOD FOR MAPPING INTERRUPT REQUESTS IN A HIGH-SPEED CPU INTERCONNECT BUS SYSTEM

CROSS REFERENCE TO RELATED APPLICATIONS

This is a continuation of application Ser. No. 08/425,254 filed Apr. 17,1995, now abandoned which is a continuation of Ser. No. 086,719 filed Jul. 2, 1993.

FIELD OF THE INVENTION

The present invention relates generally to computers, and more specifically to a bus system for interconnecting the central processing unit and other integrated circuits in a general-purpose computer.

BACKGROUND OF THE INVENTION

In the about two decades since their introduction, desktop computers have become commonplace. There are now more than 80 million desktop computers of different types in use around the world. IBM-compatibles and Apple Macintoshes, which are used for general business applications, comprise about 90% of the machines sold today. These are collectively known as personal computers, but IBM compatibles are usually called PCs, while the Apples are called Macs. The remaining 10% of the market is occupied by higher powered and more expensive machines, generally called engineering "workstations", from Sun Microsystems, Hewlett Packard, Silicon Graphics, Digital Equipment Corporation (DEC), etc.

The Macs and the different types of workstations are proprietary systems that are each made by a single manufacturer. However, PCs have an open architecture. This made possible the entry of a large number of different manufacturers, which lead to the explosive growth of the PC market. However, this growth in the business of developing and selling PCs and peripherals has brought about an extreme level of competition. Because of the very large number of competitors and the high degree of similarity between competing products, the market has become cost driven. Many computer consumers buy the lowest cost machine in a given central processing unit (CPU) class, with little or no brand preference. Consequently, all vendors must compete vigorously on price. The price/performance ratio has become the most important factor in the PC market.

The main component of a typical PC is the motherboard (MB), or a large circuit board that holds the CPU, such as an Intel 80486, random access memory (RAM), control chips, and buffer chips. Expansion slots, which are elongated electrical connectors, on the MB accept peripheral devices such as video controller boards or cards, I/O cards, hard/floppy drive controller cards, network adapters, modems, and so forth. These cards usually control other devices such as monitors, hard and floppy drives, scanners, and more.

A bus structure handles the communication between the separate chips and peripherals. This bus structure includes individual conductive traces (signal paths) on the circuit boards that link the individual components, control chips for controlling the transfer of the signals, and connectors for plugging in the various expansion cards on the MB. The present invention relates closely to such bus structures or architectures.

Early digital computers manipulated 4-bit binary information, or words with a length of 4 decimal places. This communicated a maximum quantity of data of up to 16D, where the D simply indicates a base-ten decimal number. These gave way to more powerful machines with 8-bit communication capability. Today 32-bit data transfer is common. Longer word lengths allow more words or data to be manipulated, and increase the data transfer rate between the various components within a computer.

The word length of the binary code also strongly indicates the bus width, or the number of signal paths on the bus. In most PCs, each bit of information requires a separate signal path for its transfer within the machine. For example, in a computer capable of addressing memory with 32-bit addresses and transferring data with 32-bit word lengths, 64 traces are needed for the address bus and the data bus alone, because the two are usually kept separate. However, many additional paths are needed for other functions, such as I/O cycles, interrupt requests (IRQs), etc.

The number of pins on the IC (integrated circuit) packages that connect to the bus is directly related to the bus width. For example, if there are to be 64 paths for the address bus and the data bus, then every IC that communicates with the bus must have 64 pins to connect to just that part of the bus structure. However, most machines have more than 64 paths in the bus and more than 64 pins in the ICs. For example, the IBM-compatible ISA (Industry Standard Architecture) bus has 96 signals, each with a dedicated trace. The large number of traces makes the layouts on the MB and peripherals very complicated and expensive. Among the 96 signals, at least 80 are typically active simultaneously, each requiring a current of 24 milliamps (ma), and switching at a speed of about 8 MHz. This amounts to a high frequency loading of 1.6 amps, which causes heat buildup and radio frequency interference (RFI) of concern to the Federal Communications Commission.

As the clock speeds of PCs increase, the physical length of the signal paths has become another important consideration in bus design. Longer paths can cause longer delays, because signals propagate through the paths at finite speeds. Delays on the order of nanoseconds can have significant impact in the performance of high frequency machines.

Another important consideration in computer design is compatibility. The vast majority of new PC hardware must work with the installed base of existing hardware and software, otherwise the new machines and devices will not gain acceptance in the market place. Therefore, hardware manufacturers expend a great deal of effort to ensure that their new and advanced products remain compatible with most existing equipment.

In some general-purpose computer architectures, such as DEC's Turbochannel bus used in powerful workstations, the address and data buses are combined into a single bus. The address and data signals are multiplexed, or alternated, so that they can both be carried on the same group of 32 signal paths. Many benefits accrue as a result of multiplexing the address and data buses. For example, the pin numbers on ICs and motherboard layout congestion are greatly reduced. The reduced congestion allows shorter signal paths, so that signal delays are also reduced. The reduction in the size and complexity of many components provide cost savings. However, multiplexed bus architectures have so far been limited typically to workstations.

Power consumption, pin count, complexity, path length and so forth, have critical application in portable computers, such as notebook and laptop computers. What is needed, especially to advance the power, useful life, and cost issues for such computers is a bus system and structure that radically reduces pin count, power consumption, complexity, and buffer requirements.

SUMMARY OF THE INVENTION

An optimized computer bus system for digital communication between a CPU and I/O devices is provided, comprising a signal path having parallel electrical conductors for carrying signals to and from the I/O devices, and bus control connected to the signal path means for communicating with the CPU and for sending and receiving signals on the signal path. There is also random access memory means connected to the bus control means for storing digital information. The bus control means comprises an interrupt control means for mapping interrupt requests from the I/O devices to the random access memory means for communicating to the CPU.

The optimized computer bus in one aspect has an interface device for coupling the optimized bus to an industry standard bus such as an ISA bus or an EISA bus.

In another aspect a general-purpose computer is provided having an optimized I/O bus according to the above description. In this aspect the CPU for the computer is coupled to a bus controller and a data buffer by local 32-bit-width data and address buses, and system RAM is connected to both the controller and the data buffer. In this aspect, the optimized I/O bus is limited to 42 parallel signal paths, 32 of which are dedicated to multiplexed address and 32-bit data words.

Power consumption, pin count, complexity, and path length are optimized by the invention, providing a bus and associated computer architecture particularly suited to portable computers such as notebook, laptop, and palmtop computers. The optimized bus structure radically reduces pin count, power consumption, complexity, and buffer requirements.

DESCRIPTION OF THE PREFERRED EMBODIMENTS

Figure 1:
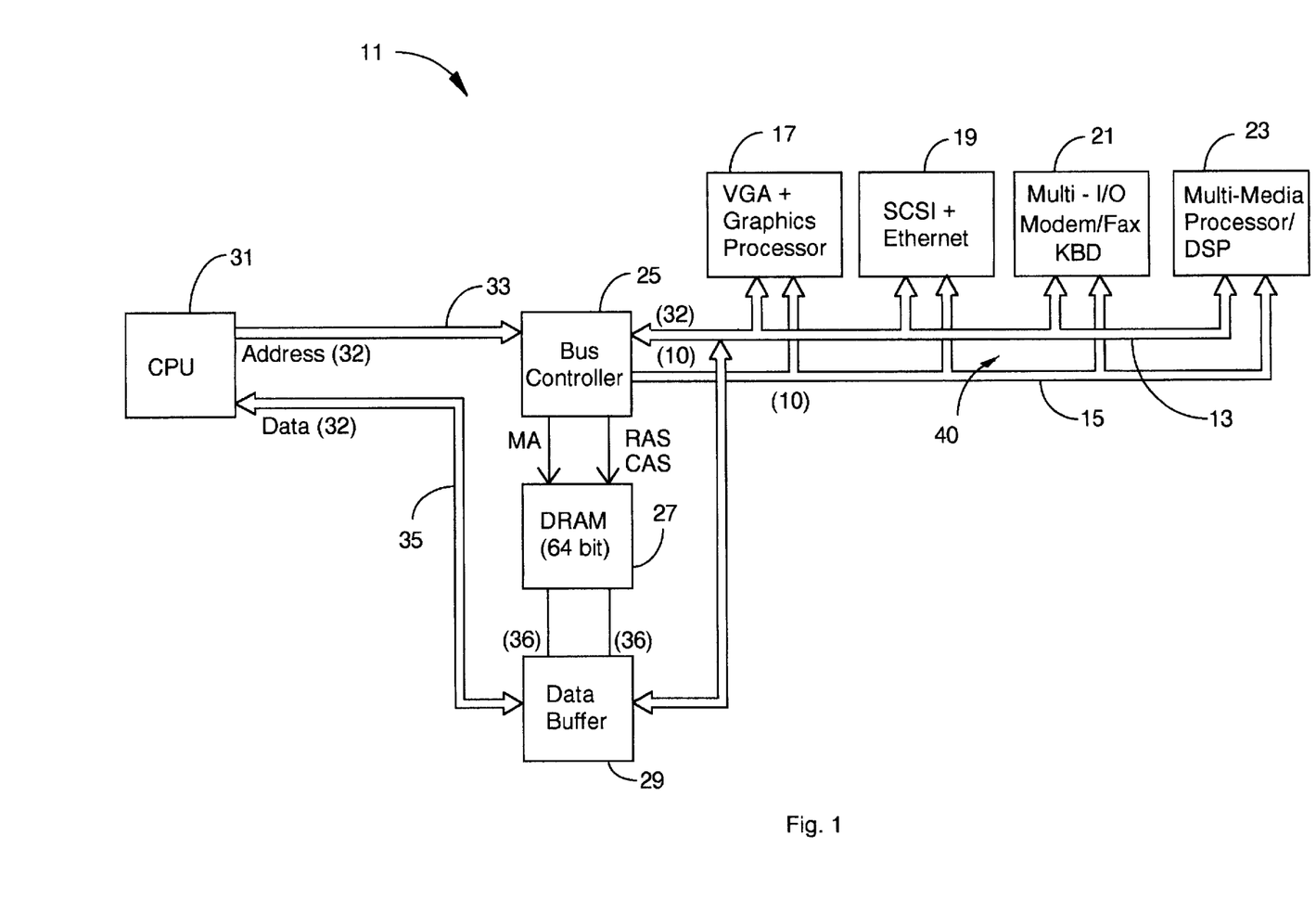
FIG. 1 is a block diagram illustrating a computer architecture according to one embodiment of the invention.

FIG. 1 is a block diagram of a computer architecture 11 according to the present invention. Paths 13 and 15 together represent an optimized High-Speed CPU Interconnect Bus called the HCI Bus by the inventors. The computer architecture based on the HCI bus is hereinafter the HCI architecture. It can be applied to PCs, Macs, workstations, as well as other types of computers, and is especially useful for portable computers such as notebook and palmtop computers.

Path 13 has 32 traces, and represents multiplexed, address-and-data combination bus capable of conveying both 32 bit addresses and 32 bit data words. Path 15 has 10 traces for control signals further detailed below. The two paths together comprise the HCI Bus 40, a total of 42 traces, a considerably smaller number than most conventional bus structures, even multiplexed bus structures. The reduction in the number of traces results in a reduction in layout congestion, with a consequent reduction in the length of the traces. The shortened traces in turn reduce signal delays, so that the computer's performance is increased.

Peripheral I/O or expansion devices for the HCI computer architecture are represented by devices 17, 19, 21, and 23. They are shown coupled to HCI bus 40, preferably through expansion slots or connectors (not shown). VGA and Graphics processor card 17 includes high-speed video memory, and is responsible for displaying information on a connected monitor. SCSI and Ethernet interface card 19 provides coupling to various SCSI equipment, such as CD-ROM drives and tape backups, and to Ethernet local area networks. Multi-I/O card 21 is an interface for hard disks, floppy drives, fax/modems, keyboards, etc. Multi-media processor/DSP (digital signal processor) card 23 is a high-speed I/O and processor for audio and video signals, and can typically drive external speakers or audio amplifiers. Many other types of peripheral devices can be connected to HCI bus 40. Similar devices are widely available for most existing computer architectures. Suitable and relatively simple modifications can be made to make them compatible with the HCI Bus. The reduced number of traces in the HCI Bus in turn allows a reduction in the number of traces and connection contact pads on the peripheral devices.

Other than the peripheral interfaces, the basic computer in the HCI architecture is implemented in just four ICs. A system control chip 25 controls the bus, and contains the system clock (not shown). System memory 27 is high-speed, low-power, dynamic random access memory (DRAM). It communicates with the system controller through multiplexed addressing (MA) of standard rows address signals (RAS) and column address signals (CAS). 64-bit memory is used for better performance, although 32-bit memory can also be used. Data buffer 29 is the only buffer required in the system, because the bus can be driven by low power CMOS (complimentary metal-oxide semiconductor) outputs.

As an example specific to the buffer requirement, the conventional ISA bus is designed to support a TTL definition that is over a decade old. It requires a driving current of 24 ma multiplied by about 80 active signals, which amounts to about 1.6 amps, as described above. This large load requires, in most implementations, as many as twenty small buffer chips, or four or five large ones. The overhead incurred in terms of bus length, heat, RFI, complexity, and so forth, is enormous. In contrast, the HCI architecture has virtually no DC loading and operates at about 10 milliamps per trace, multiplied by about 42 active traces switching at the same speed as most CPUs, or 16 to 33 MHz. As a result, only a single buffer is required in the HCI bus.

Computation in the HCI architecture, as in others, is handled by a CPU 31. The CPU is coupled to system controller 25 by a short 32-bit address bus 33, and to data buffer 29 by a short 32-bit data bus 35. Data is transferred between buffer 29 and DRAM 27 through short but separate address and data buses. Each of these buses has 36 signal paths, 32 of which are for address or data, and 4 are for control.

A significant feature of the HCI architecture is that it may be configured to support a large number of CPUs. Multiplexed buses have been designed in the past, such as the DEC TurboChannel, but these designs are compatible with only a single type of CPU or a single class of CPUs made by a particular manufacturer. In the HCI architecture, the CPU can be virtually any of the many available high-end microprocessors, such as the Intel 80486 and Pentium, DEC Alpha, Motorola 680x0, Sun SPARCs, and many others.

This important advantage of multi-CPU compatibility, or CPU independence, is provided by system controller 25. This chip has a programmable state machine for translating between the state dynamics of a variety of supported CPUs and the state dynamics of the HCI Bus. The programming can be done in a variety of ways, including EPROM, mask, RAM, etc. Even auto-programming can be achieved. In the case of auto-programming, the system controller will automatically recognize the CPU by reading the state, either pull-up or pull-down, of the CPU's output lines. The pattern of these outputs is compared to a database of the patterns of known CPUs until a match is found. The system controller will then use the proper protocols to translate between the CPU and the HCI bus architecture.

In different embodiments of the invention, different types of programmability will be preferable. For example, on a MB designed to work with a variety of CPUs, an auto-programmable system controller will be preferred. In most cases, the HCI architecture will be designed to work with a single type of CPU, so that it is not necessary to change the setting. In these cases, mask programming is most cost effective.

Another feature of the HCI architecture is support for a high-speed master mode, programmed at the system controller chip. Each type of processor has its own algorithm for burst data transmission. In setting up the generic system controller to be compatible with a particular CPU, the system controller's master mode is set to be initiated and operated by the burst algorithm of the processor used.

Data transfer mechanisms of the architecture are CPU write to HCI, CPU read from HCI, HCI write to main memory, and HCI read from main memory.

Figure 2:
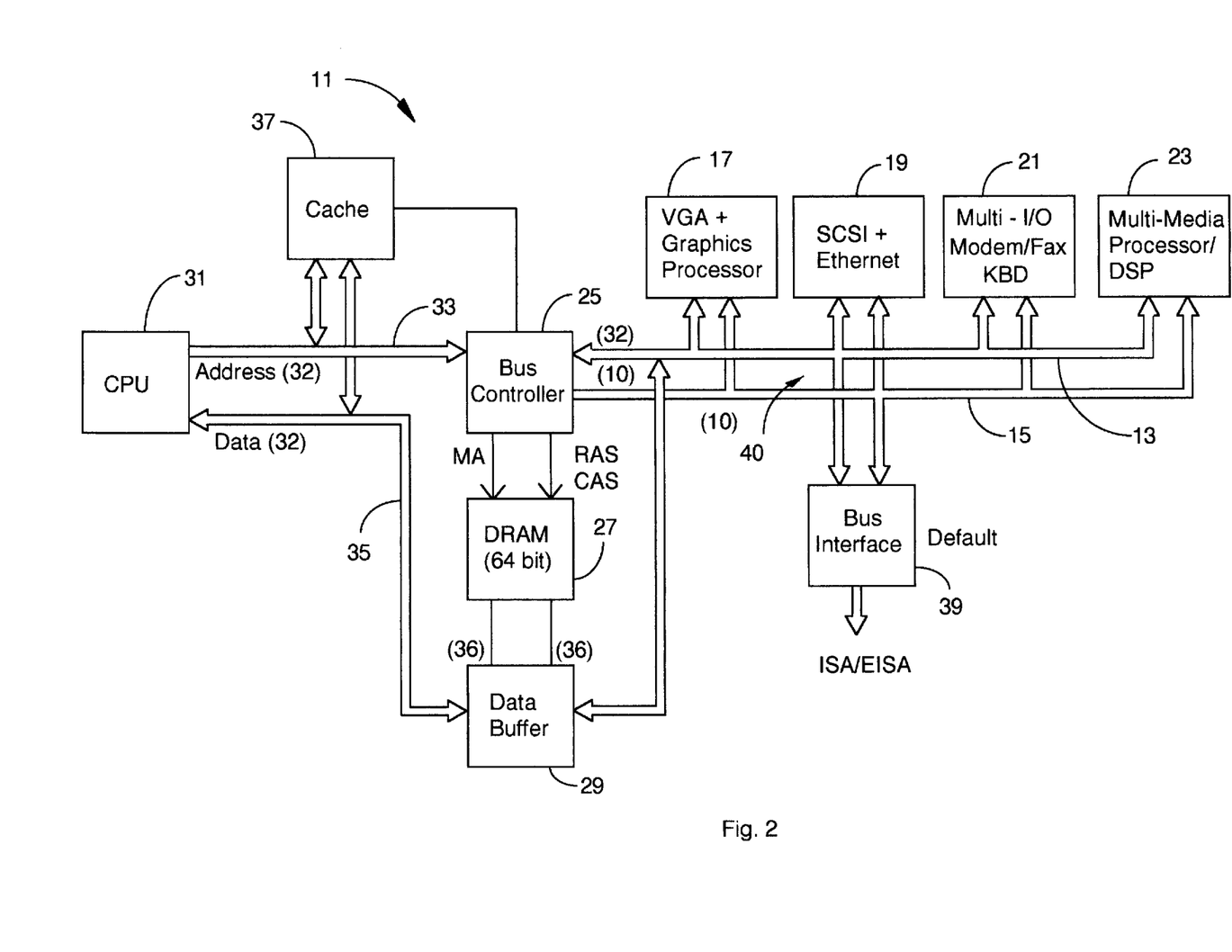
FIG. 2 is a block diagram illustrating a computer architecture as shown in FIG. 1, comprising also an optional interface and cache system.

FIG. 2 shows an alternative embodiment of the HCI architecture, comprising the architecture of FIG. 1 with additional, optional components. To increase performance, high-speed cache memory 37 can be coupled to the address and data buses from the CPU. It is controlled by the system controller. The cache need not be specifically designed to be compatible with HCI state dynamics, because it couples to the CPU bus instead of the HCI Bus.

Another option is a bus interface 39 for coupling the HCI bus to other bus structures, such as ISA, EISA, Microchannel, etc. The bus interface comprises an IC designed to convert between the state dynamics of the HCI bus and the dynamics of the bus to which the HCI bus is to be coupled. For example, when a device on an ISA bus issues an interrupt, the devices on the HCI bus will not answer. In this case, bus interface 39 will become the default device which answers the interrupt.

Figure 3:
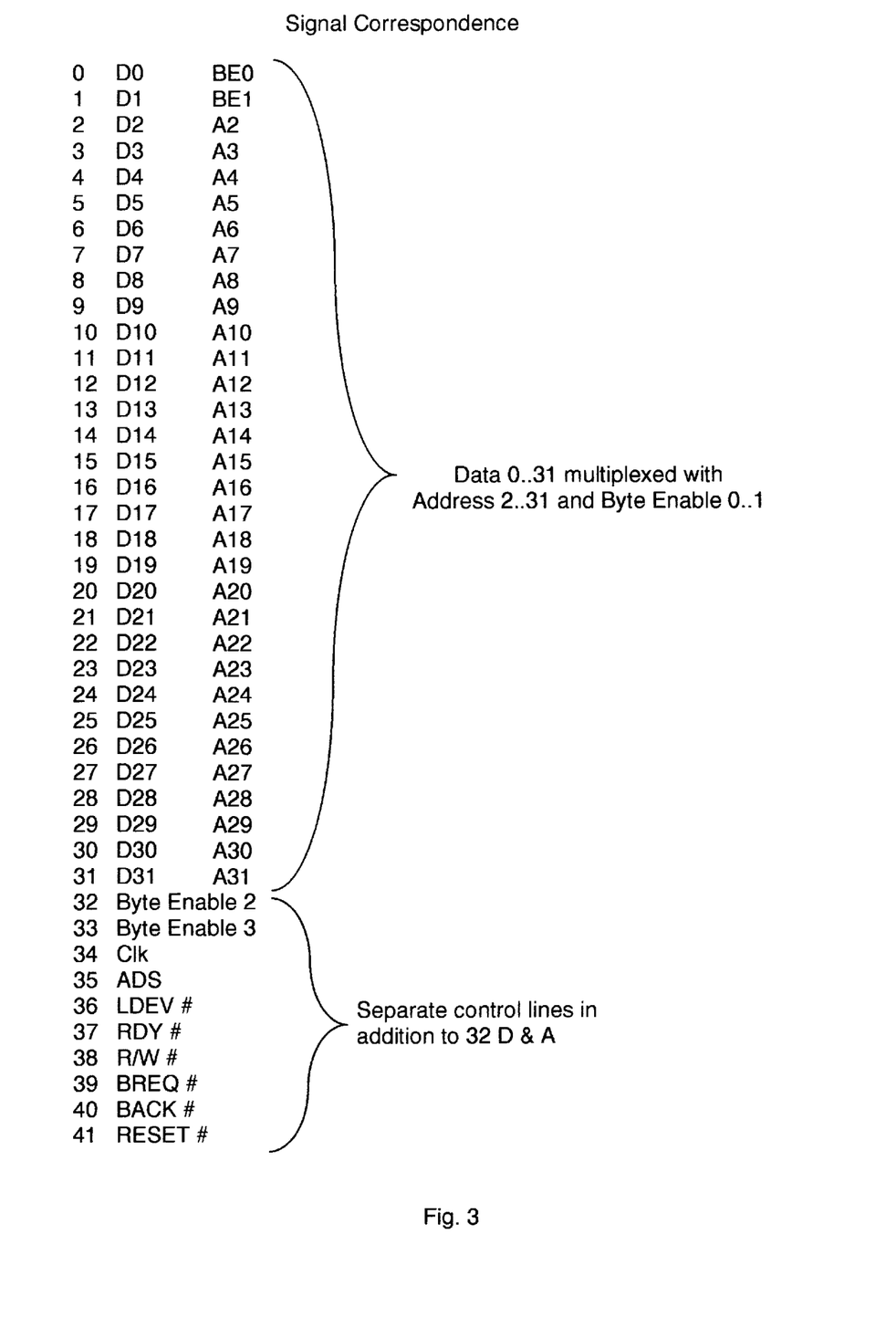
FIG. 3 is a pin-out listing of the optimized bus structure of the invention in a preferred embodiment.

FIG. 3 is a listing of the signals for the 42 lines of the HCI bus in the present embodiment. The pin numbers 0–41 in the left column are for reference only, and do not imply that the signals could not be in another order. The pins are used as follows:

| | |
|---|---|
| Data0..31 | are multiplexed with address2..31 & BE0..1 |
| BE2..3 | are remaining byte enables. |
| CLK | Bus clock. |
| ADS | Address strobe. This is used to start a cycle, and to indicate the burst length. ADS is low for one cycle for single word transfers. For burst transfers, it will remain low until the ready before the last word. |
| LDEV# | Device decode. This is used to indicate that a device is clamping a cycle. If no device pulls this line, the cycle will go to the default device, such as ISA bus interface 39. This signal is necessary for zero wait-state write support. |
| RDY# | Ready. Low indicates that valid read data is on the bus, or that a write word has been accepted. |
| R/W# | Read/Write. This is driven simultaneously with the address. |
| BREQ# | Bus request. A bus-mastering peripheral pulls low to request bus ownership. It is specific to each device. |
| BACK# | Bus acknowledge or grant. Goes low when bus ownership is granted. It is specific to each device. |
| RESET# | Low = system reset. |

In conventional bus structures, in addition to the address, data, and control lines, many additional paths are needed for I/O and interrupt signals. An interrupt controller IC reads the IRQ signals, then triggers an interrupt in the CPU. This is a significant source of layout congestion in such architectures.

Figure 4A:
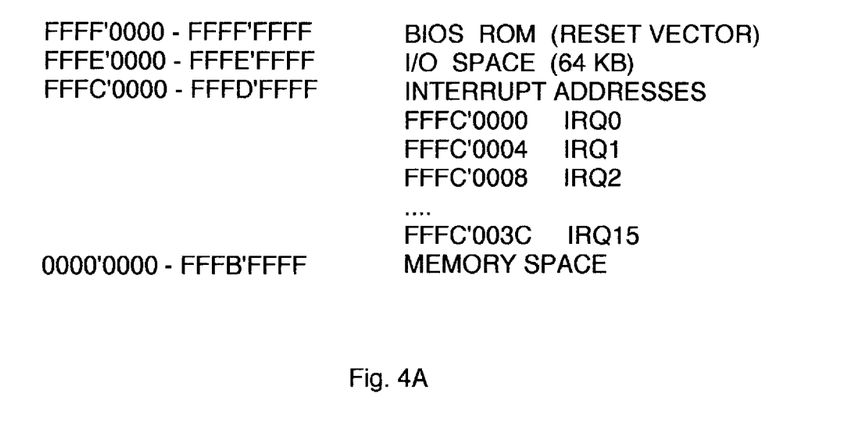
FIG. 4A illustrates a memory mapping scheme for a general-purpose computer according to an embodiment of the present invention.
Figure 4B:
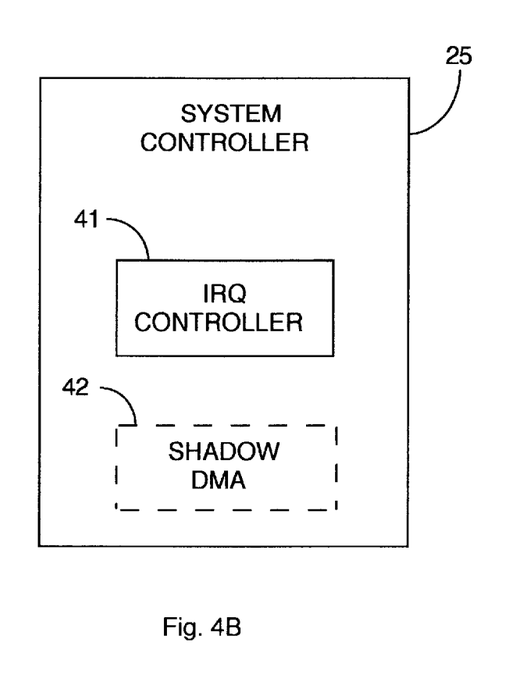
FIG. 4B illustrates a bus controller incorporating an IRQ controller and a shadow DMA controller according to an embodiment of the invention.

In the HCI bus, instead of issuing interrupts on dedicated paths, IRQs are mapped into high memory, as shown for example in the memory map in FIG. 4A. In this case, bus-mastering peripherals will first take control of the bus, then make master-mode memory writes to a predetermined block of addresses set aside for interrupts. Each interrupt, for example, from IRQ0 to IRQ15, is assigned a particular address. Also instead of using a separate IC for controlling interrupts, an interrupt controller 41 is built into system controller 25. The IRQ controller monitors the address space to trigger the appropriate interrupts. As a result, many paths and pins are saved.

Similarly, instead of communicating I/O on a dedicated path, it is also mapped into high memory. A small space, such as the 64K block from FFFE ' 0000 to FFFE ' FFFF, is set aside for I/O cycles. The mapping of I/O to high memory saves an additional one pin. The Intel CPU architecture has a separate I/O address space that can be accessed only by special instruction, such as IN, OUT, INS, and OUTS. This mapping will allow HCI-compatible devices to be used with other CPUs that do not have a separate I/O space.

Direct memory access (DMA) is not supported in the HCI bus. However, a "shadow" DMA controller 42 can be implemented by using just registers in the system controller to mimic an actual DMA controller.

The calculated performance of the HCI bus is as follows: Maximum burst rate is 132 MBytes/sec at 33 MHz, if the memory system supports one cycle per word burst. HCI master write is accomplished in a minimum of 2 cycles. HCI master read is accomplished in a minimum of 3 cycles (or 4 cycles back-to-back). CPU write is a minimum 2 cycles (or 3 cycles back-to-back). CPU read is a minimum 3 cycles (or 4 cycles back-to-back).

Figure 5:
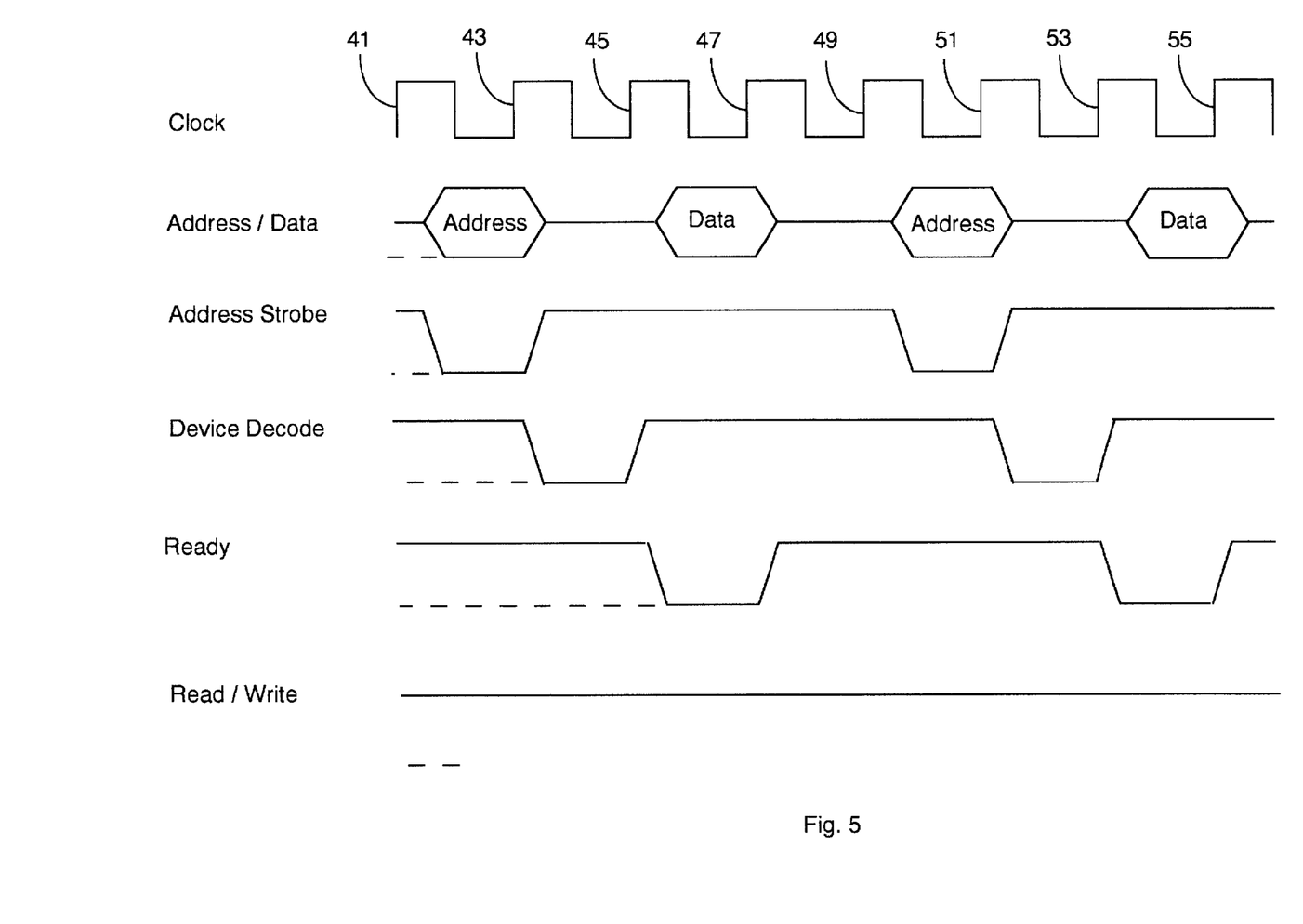
FIG. 5 is a timing diagram showing the states of the Clock, HCI Bus Address/Data, Address Strobe, Device Decode, Ready, and Read/Write lines during back-to-back read operations in an embodiment of the invention.

FIG. 5 is a timing diagram showing the states of the Clock, HCI Bus Address/Data, Address Strobe, Device Decode, Ready, and Read/Write lines during back-to-back read operations. The first read operation is initiated when Address and Byte Enable bits (BE0, BE1, A2 . . . A31 from lines 0 to 31 in FIG. 3) are enabled onto the bus after clock transition 41, simultaneously as the Address Strobe line is also enabled. These signal transitions are slightly delayed behind the clock transition that switches them (shown here as a quarter-cycle delay). The Read/Write line remains high throughout to indicate this is a read operation. The Address and Address Strobe signals remain asserted for one clock cycle and are disabled following clock transition 43. The one cycle Address Strobe indicates a single word transfer. After clock transition 43 the Device Decode line is asserted to indicate that a device is claiming the cycle. Data from the decoded address is enabled onto the bus following clock transition 45, while Ready is also enabled to indicate that valid data is on the bus. Ready and Data remain enabled for one clock cycle until they are disabled following clock transition 47. Dead cycles after clock transitions 43 and 47 prevent bus contention. An identical read cycle is initiated after clock transition 49.

Dead cycles, or wait-states, are required in the first cycle of a read, and in an address cycle following a read to prevent bus contention. Change of bus ownership also requires a wait-state to avoid contention. Other operations, such as write cycles or following cycles in a burst, do not require wait-states.

Figure 6:
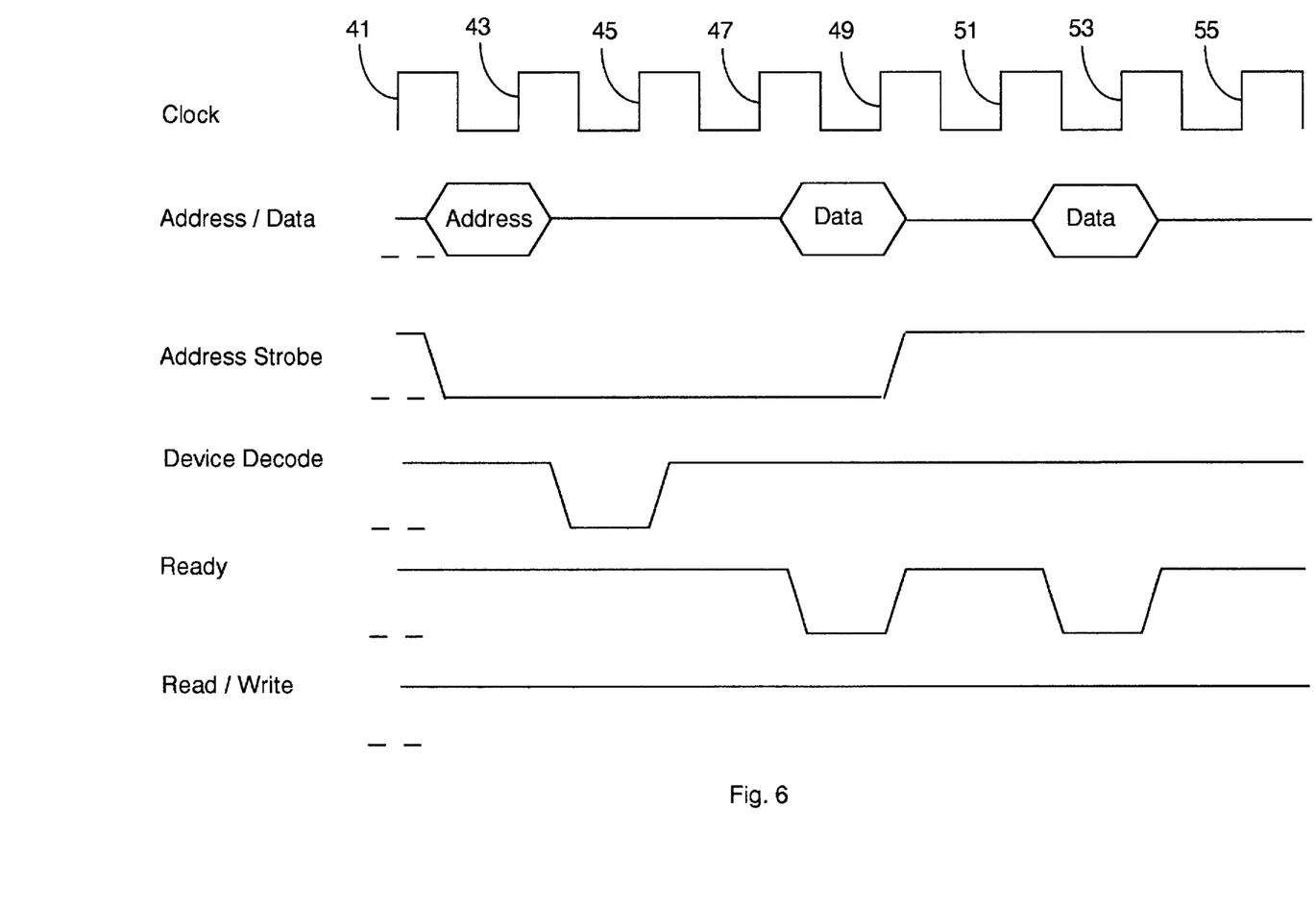
FIG. 6 is a timing diagram showing the bus states for a burst-mode read operation, also called a HCI master-mode read, in an embodiment of the present invention.

FIG. 6 is a timing diagram showing the bus states for a burst-mode read operation, also called a HCI master-mode read. A burst-mode transfer is one in which a block of data is transferred in consecutive data cycles, but the address is transmitted only once at the beginning of the operation. Elimination of address cycles between each data cycle results in substantial throughput gains for bursts of even a few data words.

For clarity, FIG. 6 shows only two data cycles in a burst transfer. The different CPUs that can be used with the HCI Bus will differ in their burst transfer characteristics. In particular, they differ in the number of data words that can be transferred in a single burst, and in the counting sequence. For example, he Intel 80486 supports bursts of up to 4 words. System controller 25 will be suitably programmed to accommodate these differences.

As shown in FIG. 6 a burst-mode read operation begins following clock transition 41 with a bus state similar to the single-word read operation shown in FIG. 5. The Address Strobe is enabled to start the Address cycle. Device Decode is enabled after the Address cycle to indicate address decoding is in progress. Unlike the single-word operation, the Address Strobe will remain enabled after the Address cycle until the ready before the last word, following clock transition 49 in this case, to maintain a burst. When data is being transferred following clock transitions 47 and 51, Ready is driven low to indicate that valid data is on the bus. Although a one clock cycle wait-state is shown between the data cycles, it is not necessary in this case. Successive data cycles in a burst can be done at zero wait-state.

Figure 7:
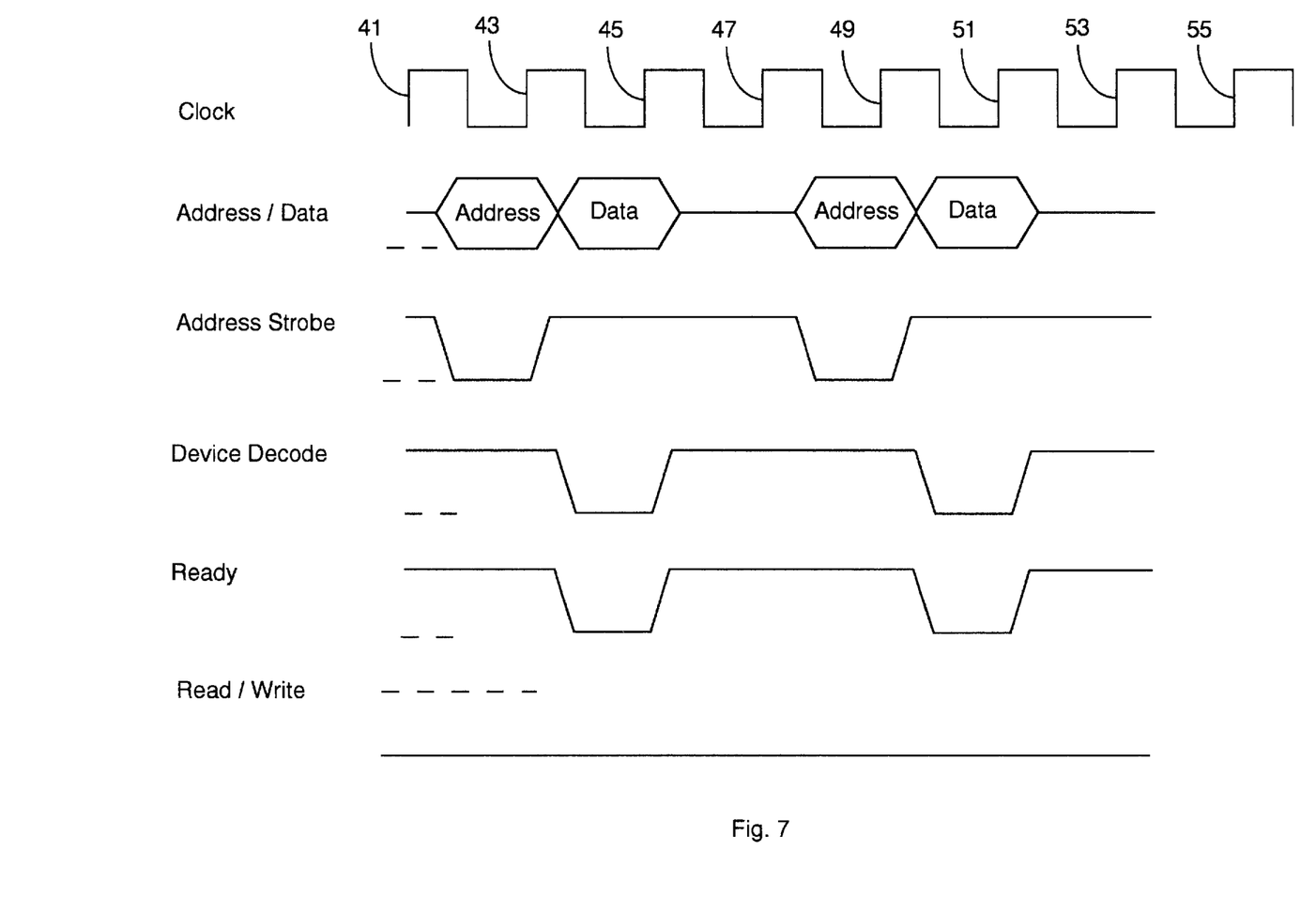
FIG. 7 is a timing diagram showing the HCI bus states for back-to-back write cycles in an embodiment of the invention.

FIG. 7 is a timing diagram showing the HCI bus states for back-to-back write cycles. As in FIG. 5, the Address Strobe is enabled for one cycle following clock transition 41, while an Address is also Enabled onto the Address/Data lines. Unlike FIG. 5, the Read/Write line is enabled following clock transition 41 to signal a write operation. At the end of the address cycle, following clock transition 43, data is enabled onto the bus, while Device Decode is enabled to indicate that address decoding is in progress. Ready is driven low concurrently with the data cycle to indicate that valid data is on the bus. The write operation ends following clock transition 45, when the Address Strobe, Decode, Ready, and Read/Write lines are all returned to a high state.

Successive write operations repeat the states just described, one of which is shown following clock transition 47. A free cycle is shown between the two writes, from clock transition 45 to 47, but none is required.

Figure 8:
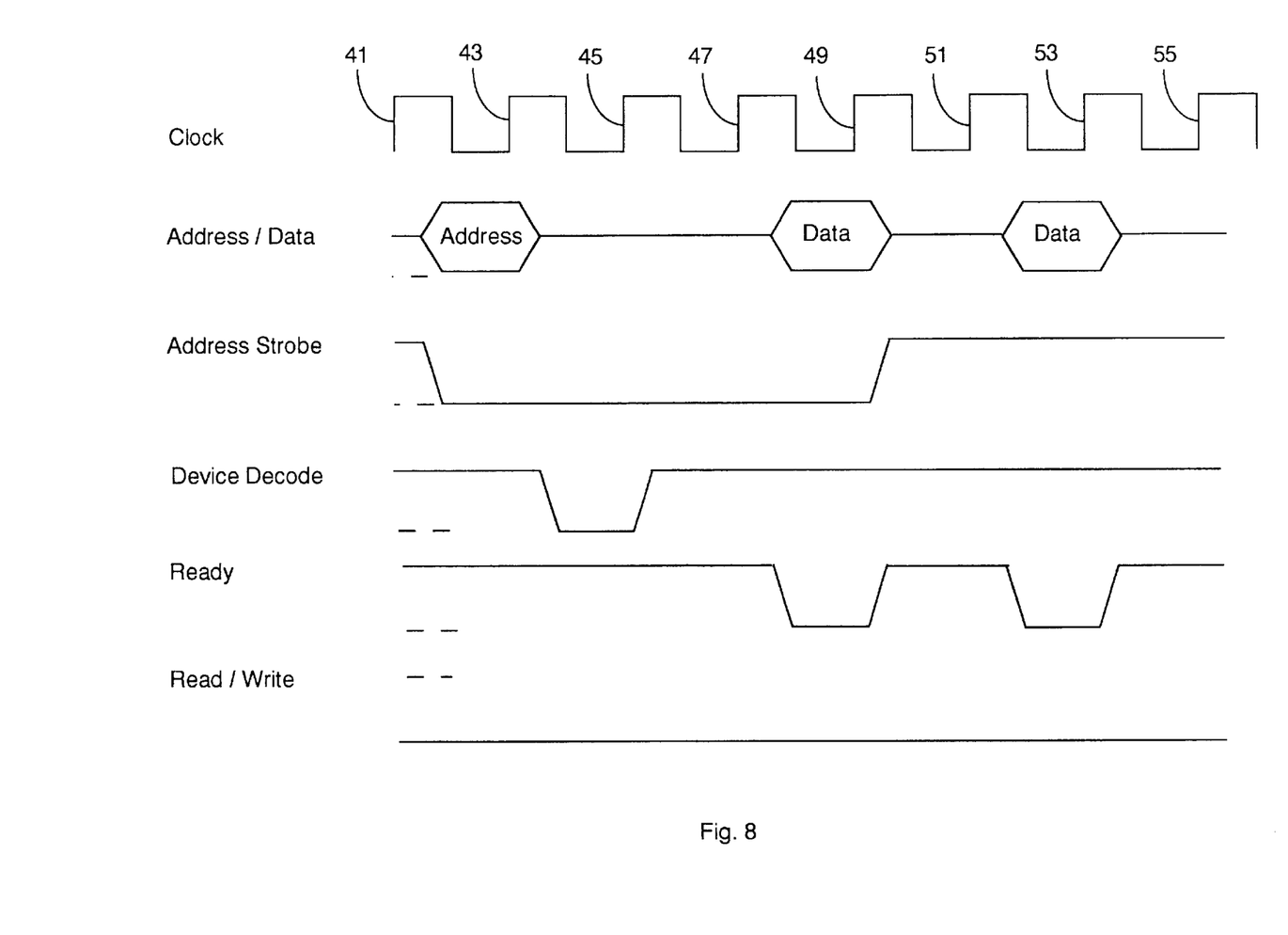
FIG. 8 is a timing diagram showing the HCI bus states for a burst-mode write transfer in an embodiment of the present invention.

FIG. 8 is a timing diagram showing the HCI bus states for a burst-mode write transfer. These states are similar to the states for a burst-mode read transfer, as shown in FIG. 6, for all lines except the Read/Write line, which is asserted following clock transition 41 to signal a write. Although wait-states are shown, they are not required. The first write data can come immediately after the address, as in FIG. 7.

What is claimed is:

1. A computer bus system connecting a CPU to connected peripheral devices, comprising:

a plurality of signal lines excluding any interrupt request (IRQ) lines but including address lines between said CPU and said connected peripheral devices, said connected peripheral devices assigning predetermined interrupt signals to predetermined addresses on said address lines and sending said predetermined interrupt signals to said CPU as said predetermined addresses on said address lines; and an interrupt controller connected to said address lines, said interrupt controller being adapted to decode said predetermined addresses from said connected peripheral devices on said address lines as said predetermined interrupt signals from said connected peripheral devices to said CPU.

2. A computer bus system as in claim 1 additionally comprising a bus interface connected to said plurality of signal lines, the bus interface being adapted for translating bus states between said computer bus system and an industry standard computer bus system.

3. A computer bus system as in claim 2 wherein said industry standard computer bus system is one of an ISA bus, an EISA bus, or a Turbochannel bus.

4. A computer bus system as in claim 2 wherein said bus interface is a default device configured to respond I/O signals directed on said computer bus system to industry standard I/O devices connected to said industry standard computer bus system.

5. A computer bus system as in claim 1 wherein said plurality of signal lines comprise no more than 42 signal lines, and of the no more than 42 signal lines, a total of 32 lines are devoted to addresses and data, and wherein bus control circuitry multiplexes addresses and data on the 32 lines devoted to addresses and data.

6. A computer bus system as in claim 5 wherein said plurality of signal lines comprises a set of signal lines that are not address and data lines and wherein said set comprises 2 dedicated byte-enable lines, a dedicated CLK (clock) signal line, a dedicated address strobe line for starting a cycle and indicating a burst length, a dedicated device decode line for indicating that a device is claiming a cycle, a dedicated Ready line for indicating one of valid read data or a write word has been accepted, a dedicated read/write line driven simultaneously with the address signals, a dedicated bus request line for indicating a request by a peripheral device for bus ownership and specific to each peripheral device, a dedicated bus acknowledge signal line for bus acknowledge, also specific to each device, and a reset signal line to signal system reset.

7. A computer bus system as in claim 1 wherein said predetermined interrupt signals are mapped to particular high memory addresses addressable by said address lines.

8. A computer bus system as in claim 1 wherein input/output signals from/to said connected peripheral devices are sent to/from said CPU via an I/O address block at a certain address addressable by said address lines.

9. A computer bus system as in claim 1 wherein said interrupt controller includes registers which mimic a direct memory access (DMA) controller for processing DMA requests from said connected peripheral devices.

10. A computer system comprising:
   a CPU;
   a bus system excluding any interrupt request (IRQ) line but including address lines connecting said CPU to connected peripheral devices, said connected peripheral devices assigning predetermined interrupt signals to predetermined addresses on said address lines and sending said predetermined interrupt signals to said CPU as said predetermined address signals on said address lines; and
   an interrupt controller connected to said CPU and to said address lines, said interrupt controller being adapted to decode said predetermined addresses from said connected peripheral devices on said address lines as said predetermined interrupt signals from said connected peripheral devices to said CPU.

11. A computer system as in claim 10 further comprising a programmable CPU interface, the programmable CPU interface having access to data tables and control routines stored in a memory connected to said programmable CPU interface, wherein data and control routines specific to a CPU type are selectable by said programmable CPU interface to operate individual ones of different types of CPUs.

12. A computer system as in claim 11 further comprising a cache memory connected to a local bus between said CPU and said programmable CPU interface for caching data between said CPU and said programmable CPU interface.

13. A computer system as in claim 10 further comprising a bus interface connected to said bus system for translating bus states between said bus system and an industry standard computer bus system.

14. A computer system as in claim 11 wherein said industry standard computer bus system is one of an ISA bus, an EISA bus, or a Turbochannel bus.

15. A computer system as in claim 13 wherein said bus interface is a default device configured to respond to I/O signals directed on said bus system to industry standard I/O devices connected to said industry standard computer bus system.

16. A computer system as in claim 10 wherein said bus system comprises no more than 42 signal lines, and of the no more than 42 lines, a total of 32 lines are dedicated to addresses and data, with addresses and data multiplexed on the 32 address and data lines.

17. A computer system as in claim 16 wherein said signal lines comprise a set of signal lines that are not address and data lines, said set comprising two dedicated byte-enable lines, a dedicated clock signal line, a dedicated address strobe line for starting a cycle and indicating a burst length, a dedicated device decode line for indicating that a device is claiming a cycle, a dedicated Ready line for indicating one of valid read data or a write word has been accepted, a dedicated read/write line driven simultaneously with the address signals, a dedicated bus request line for indicating a request by a peripheral device for bus ownership and specific to each peripheral device, a dedicated bus acknowledge signal line, also specific to each device, and a reset signal line to signal system reset.

18. A computer system as in claim 10 wherein said predetermined interrupt signals are mapped to particular high memory addresses addressable by said address lines.

19. A computer system as in claim 10 wherein input/output signals from/to said connected peripheral devices are sent to/from said CPU via an I/O address block at a certain address addressable by said address lines.

20. A computer system as in claim 10 wherein said interrupt controller includes registers which mimic a direct memory access (DMA) controller for processing DMA requests from said connected peripheral devices.

21. A method for issuing an interrupt request signal from a peripheral device connected to a computer bus having address and data lines and a bus request line, but no interrupt request lines, comprising the steps of:
   (a) claiming use of the computer bus for the peripheral device by issuing a bus request from the peripheral device on the bus request line;
   (b) assigning said interrupt request signal to a predetermined address on said address lines;
   (c) the peripheral device issuing said predetermined address on the computer bus as said interrupt request signal for interrupting a system CPU;
   (d) decoding the issued predetermined address at an interrupt controller connected to the computer bus and to said system CPU; and
   (e) vectoring the CPU to execute a unique interrupt routine associated with the predetermined address issued by the peripheral device.

22. The method of claim 21 wherein the interrupt controller is adapted to vector the CPU to sixteen unique interrupt routines associated with sixteen unique addresses.

23. The method of claim 21 wherein said assigning step includes the step of mapping said predetermined interrupt signals to particular high memory addresses addressable by said address lines.

24. A method for reducing pinouts for a computer bus having an interrupt controller coupled to a CPU, comprising the steps of:
   (a) removing all interrupt request lines;
   (b) assigning predetermined addresses on an address line to unique interrupt routines;
   (c) adapting the interrupt controller to vector the CPU to the unique interrupt routines pointed to by said predetermined addresses upon receipt of said predetermined addresses on said address line; and
   (d) adapting peripheral devices connectable to the computer bus to issue at least one of said predetermined addresses in lieu of pulling an interrupt request line to begin an interrupt process.

* * * * *